Dec. 21, 1943.  F. RIEBER  2,337,414
METHOD AND APPARATUS FOR TESTING LUBRICATING OILS
Filed Feb. 18, 1939    3 Sheets-Sheet 1

INVENTOR.
Frank Rieber
BY John Flam
ATTORNEY.

Dec. 21, 1943.   F. RIEBER   2,337,414
METHOD AND APPARATUS FOR TESTING LUBRICATING OILS
Filed Feb. 18, 1939   3 Sheets-Sheet 2
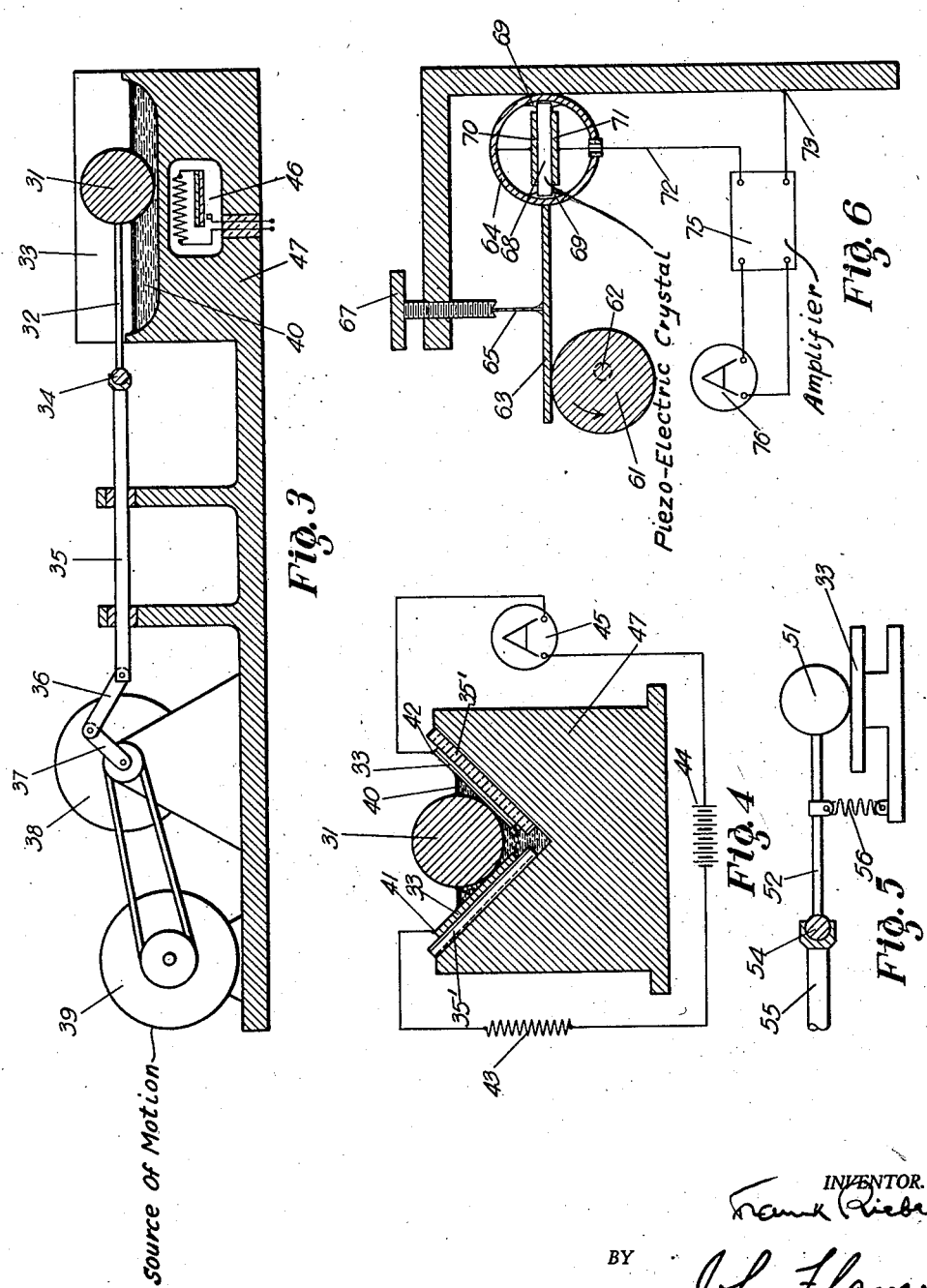

Dec. 21, 1943.  F. RIEBER  2,337,414
METHOD AND APPARATUS FOR TESTING LUBRICATING OILS
Filed Feb. 18, 1939   3 Sheets-Sheet 3
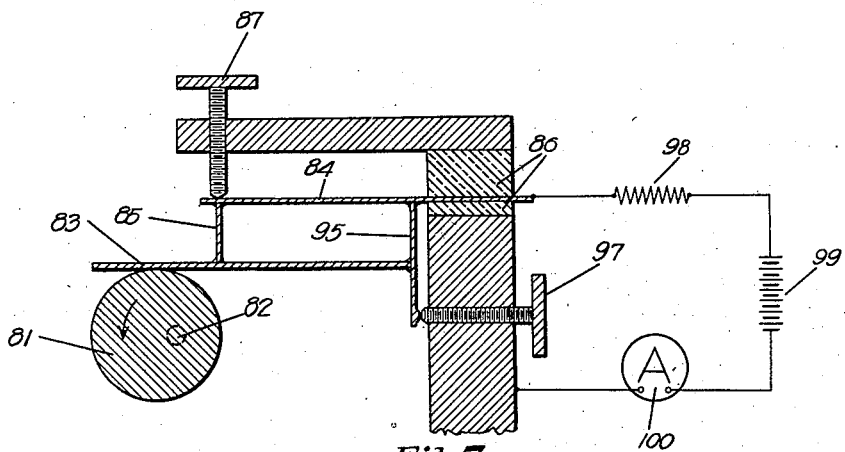
Fig. 7
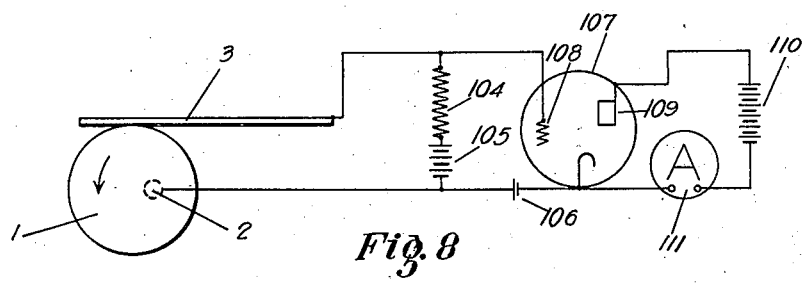
Fig. 8
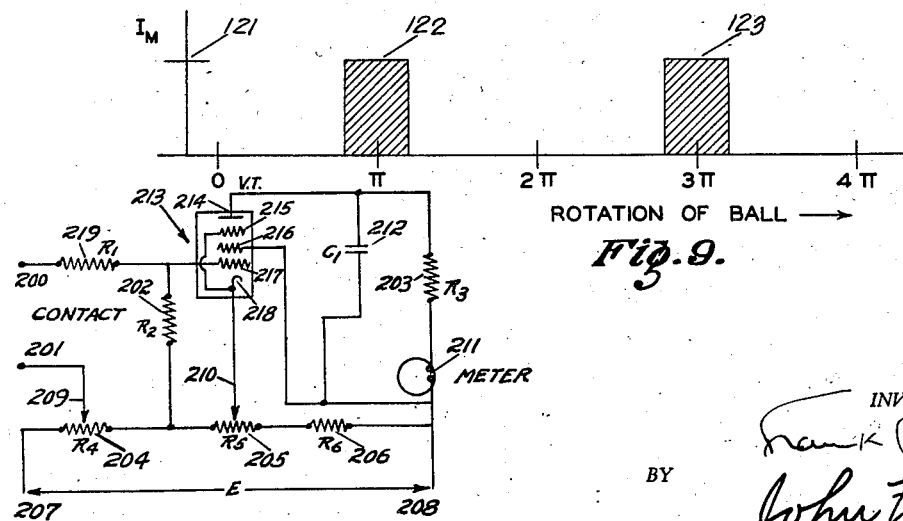
Fig. 9.
Fig. 10.
INVENTOR.
Frank Rieber
BY
John Flam
ATTORNEY.

Patented Dec. 21, 1943

2,337,414

UNITED STATES PATENT OFFICE 2,337,414

METHOD AND APPARATUS FOR TESTING LUBRICATING OILS

Frank Rieber, Los Angeles, Calif.

Application February 18, 1939, Serial No. 257,155

14 Claims. (Cl. 265—10)

The invention relates to testing the relative lubricating powers of oils such as are used for crank case lubrication of automobiles, although it is adaptable to testing a wide variety of other types of lubricant.

An object of my invention is to provide a rapid and effective method by which the lubricating powers of two or more oil samples may be compared.

A further object of my invention is to provide a standard of measurement for the lubricating power of an oil, which may be reproduced readily, and which is closely related to the actual performance of the oil when in service.

A further object of my invention is to provide a simple, inexpensive, and positive form of apparatus by which such measurements may be carried out.

Further objects of my invention will appear from the following disclosure.

Lubricating oil for automobiles is now manufactured in accordance with well known and widely accepted standards, so that the owner of any given make and model of car is informed by the maker as to the grade of oil for which he should ask when refilling the crank case.

Such oil is obtainable, in the desired grade, from service stations, in many varieties, any one of which will presumably lubricate a given car satisfactorily when first put into the crank case.

With use, this oil deteriorates. Dilution with gasoline, and loading with road dust and grit, and metallic particles from the wearing surfaces of the engine, are some of the commonly alleged causes for such deterioration.

Installation of filtering devices on cars will prolong the useful life of the oil. But eventually, car manufacturers agree, oil should be drained and replaced. Recommendations for such draining usually specify the number of miles of driving which should be done on any single filling of the crank case.

Such servicing does not take account of the differing conditions applying to individual cars, both as regard the condition and adjustment of the motor, and the type of driving done. Much stop and go driving, especially if the car is never fully warmed up for any protracted period, will greatly increase gasoline dilution. Some types of automatic choke have a tendency to further aggravate this dilution, particularly if the choke device is poorly adjusted. Long trips on the highways, at high speeds, on the other hand, tend to reduce any existing gasoline dilution by evaporation, until the amount of gasoline in the oil reaches equilibrium for the conditions of average use.

If this equilibrium point reaches an unusually high gasoline content before the specified mileage has been driven, the oil should be changed, or damage will result.

Similarly, a given number of miles driven on pavement will normally draw into the motor, and lodge in the crank case, a small quantity of dust, not sufficient to be serious. A much shorter driving distance on dusty roads may result in the accumulation of an undesirable amount of injurious grit.

Heretofore, no simple and convenient means has been available for testing crank case oil, to determine how far deterioration might have progressed.

I am to provide such testing facilities, in the method of my invention, by driving two test surfaces so that they tend to rub together, and lubricating the surfaces with the oil to be tested.

If a given oil completely separates the surfaces, under the conditions of test, so that no part of either surface strikes against the opposing surface, I consider that such oil is then acting as a satisfactory lubricant.

If another oil fails to completely separate these surfaces, under like test conditions, so that the surfaces either strike each other directly, or strike upon solid particles borne by the oil, I consider that such second oil sample has ceased to act as a complete lubricant, and is accordingly inferior to the first sample.

Test surfaces, for use in my invention, may conveniently be provided in the form of a hard polished steel ball, and a hard polished steel plate. I prefer to use surfaces of this form because they are readily obtainable, at low cost, and I find that in use, in the apparatus of my invention, they permit accurate, reproducible measurements over a long period of operation.

The velocity of motion of one test surface with respect to the other will determine the performance of the lubricant between them. Consequently, in the apparatus of my invention, I provide means for controlling such motional velocity to a known range of values.

The pressure between the test surfaces likewise influences the performance of the lubricant under test. Therefore, in my apparatus, I provide for controlling this pressure.

The temperature of the test surfaces, and of the oil, must likewise be held to an accurately known value if my method is to be satisfactorily used. It is of advantage, in comparing two oils, to make this comparison at a temperature comparable to that of actual use. Therefore, I provide my apparatus with electrical heating means, designed to maintain the temperature of the working parts at such working temperature. Heaters of this form are so well known that, in the interests of simplifying the illustrations, I have omitted details.

Contact of the test surfaces with each other, or with intervening particles, may be determined, in my invention, in several ways. For example, I may connect the two surfaces as contacts in an electric circuit, which is completed if they touch. Or I may attach a microphonic pick up to one of the surfaces, and detect the vibrations produced by scraping made by contact. Or, again, I may employ the sudden change in friction between the surfaces, occasioned by contact, to operate an electrical contact. Accordingly, I wish it understood that the expression "indicating contact" as used in this specification, may refer to any one of the methods just referred to, or to any other convenient means of indicating physical contact between the test surfaces, or contact of such surfaces established through solid particles in the oil. And I shall accordingly use the term "contact" to include direct contact, or contact through the medium of intervening grit particles and the like.

In one form of my invention, I provide test surfaces driven with a substantially constant relative velocity, and maintained at a constant temperature. After lubricating these surfaces with the oil under test, I apply pressure which varies periodically through a known range of values, this pressure being of such magnitude that, for part of its range, contact is established between the test surfaces, while for the balance of the range of pressures, true lubrication takes place, and the surfaces do not touch.

In another form of my invention, I move the surfaces with a periodically varying velocity, while maintaining them at a suitable test temperature, and with suitable test pressure, which is constant. If the surfaces are lubricated with oil to be tested, the value of pressure may be so chosen that contact of the surfaces occurs when their relative velocity falls below a certain critical value, while above this value, true lubrication takes place, and the surfaces are completely separated by an oil film.

In still another form of my invention, I cause both the pressure and the velocity to vary, synchronously and periodically, and set the pressure and velocity values so that, for properly chosen working temperature, continuously maintained, the test lubricant on the working surfaces is able to separate them properly for part of each cycle, while for the balance of the cycle contact occurs.

Thus, any one of the three forms of my invention just described, by applying a known recurrent cycle of test conditions to a tested lubricant, causes the test surfaces to contact for a fraction of each cycle, and to be separated for the balance of each cycle.

I find that by indicating such contact periods, and translating these indications to an integrating mechanism, I am able to derive, from such integrated indications, a reading which may be interpreted in terms of the lubricating value of the oil under test.

To further understand my invention, reference should be had to the accompanying diagrams, in which Figure 1 is a sectional elevation of one form of my invention, for testing oil under substantially constant temperature and velocity but variable pressure.

Fig. 3 is a partially sectioned elevation of a form of my invention where the oil to be tested is subjected to substantially constant pressure and temperature, but the velocity of the test surfaces is periodically varied.

Fig. 4 is a detailed section of the test surfaces shown in Fig. 3, taken in a plane at right angles to that of Fig. 3.

Fig. 5 is a detail of another form of test surface arrangement which may be used in the apparatus shown in Fig. 3, but provided with means for causing both pressure and velocity to vary synchronously, the temperature alone remaining constant.

Fig. 6 is a detail of contact indicating mechanism differing from that shown in Figs. 1 and 3, shown in a form adaptable to use in the arrangement given in Fig. 1. The indicating means shown in Fig. 6 is responsive to vibrations due to scraping of the surfaces.

Fig. 7 is a detail of another indicating means, responsive to frictional forces engendered by contact between the moving and stationary test surfaces, and adapted for use in the arrangement shown in Fig. 1.

Fig. 8 shows an electric circuit which may be adapted to amplify indications as produced by the arrangements shown in Fig. 1, Fig. 3 and Fig. 4.

Fig. 9 is a diagram of the effective indications produced by two successive contacts of the arrangement shown in Fig. 1, Fig. 3, Fig. 5 or Fig. 6, and Fig. 10 shows an electric circuit, adapted for use in my invention, which may be operated from alternating current supply lines.

Figure 1:
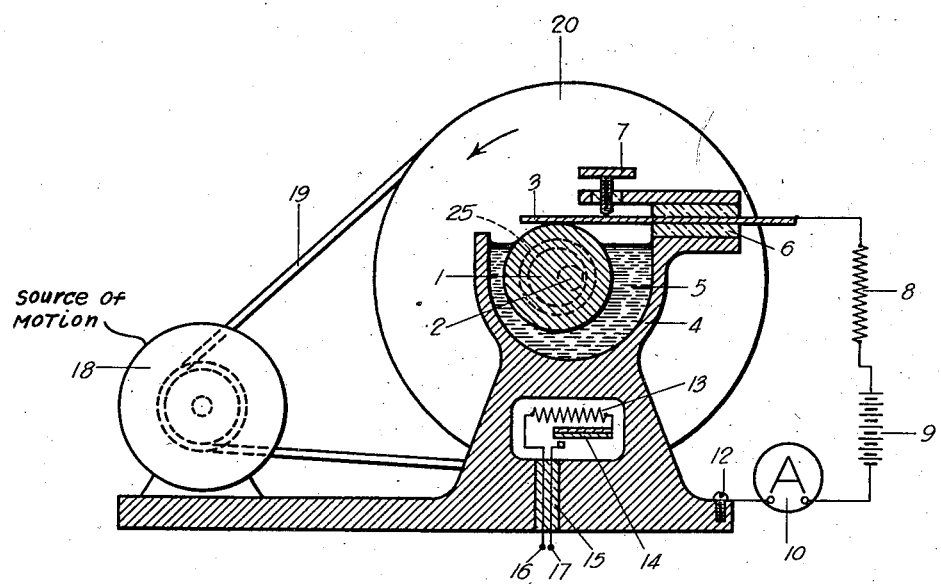
Figure 2:
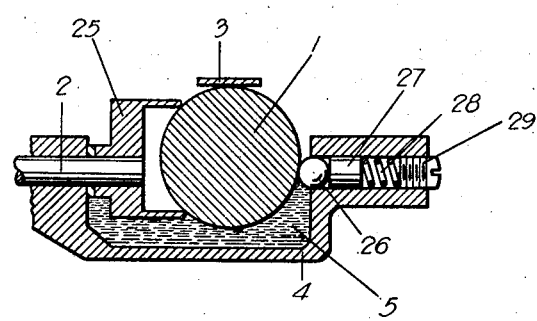
Fig. 2 is a detail sectional elevation of the test surface arrangement shown in Fig. 1, taken in a plane perpendicular to that of the drawings in Fig. 1.

Referring to Figs. 1 and 2, a ball 1 is shown as being eccentrically mounted on a shaft 2. This ball may be of metal such as steel. A leaf spring 3 is arranged to rub against the surface of the ball 1. A reservoir 4 is provided in which a sample of oil, 5, is placed for test. A plate 6 of electrical insulation, separates the spring 3 and an adjusting screw 7 from the reservoir 4. An electric circuit, containing a resistance 8, a battery 9, and a meter 10, is connected between the spring 3 and a ground connection 12 attached to the reservoir 4, so that, if the spring 3 comes into electrical contact with the ball 1, current will flow in the said circuit, and be indicated on the meter 10. An electric heating element 13 is adapted to heat the container 4 to a suitable test temperature. A thermostatic strip 14 acts to maintain this temperature at any desired predetermined value. Current is supplied to this heating system through terminals 16, 17, insulated from the frame 4 by a bushing 15. A motor 18 drives the ball 1, as by a belt 19 and a large pulley 20.

Although the ball 1 may be mounted eccentrically on the shaft 2 by any means, I prefer to use an eccentric cup 25 (Fig. 2), and to thrust the ball 1 into this cup by a spring 28, adjusted by a screw 29, and thrusting against a rod 27, which presses upon a small ball 26, the latter ball transmitting thrust to the large working ball 1. By this means the ball 1 is urged firmly against the cup 25, and at the same time, is readily demountable, for inspection or replacement, by merely releasing the screw 29.

The operation of the device shown in Figs. 1 and 2 is as follows: with the proper temperature established, and a sample of oil, 5, in place in the container 4, the ball 1 is set in rotation through the motor 18. Due to the eccentric mounting of the ball 1, the latter rubs against the spring 3 with a cyclically varying pressure. By adjusting the screw 7, this pressure may be made sufficient to cause contact of the spring 3 and the ball 1 during part of each cycle. During the balance of the cycle, the pressure will be insufficient to establish contact, and a film of oil will separate the ball from the spring.

Under these conditions, a reading will be obtained on the meter 10, which will be proportionate to the part of each cycle during which contact is established. The meter reading may thus be set at any desired value, for any given oil sample, by adjusting the screw 7.

Assume now that new oil, of a grade suitable for some certain car, is placed in the apparatus, and the screw 7 adjusted to give some chosen scale reading to the meter, say one quarter of its full scale. Without changing any adjustments, the sample of new oil is removed, and a sample of used oil from the car in question is substituted. If this used oil is identical with the new oil, in its ability to lubricate the ball and spring in my invention, a meter reading will be obtained which is identical with that of the new oil first tested. If, however, the used oil has deteriorated, due to dilution, or to the inclusion of gritty particles of conducting matter, a higher reading of the meter will result, since the less perfect lubrication cannot withstand such high pressures, and contact will accordingly be established between the test surfaces for a longer fraction of each cycle. The values of the resistance 8, and the potential of the battery 9, in Fig. 1, are preferably so set that relatively small current flows when contact is established, to avoid pitting the test surfaces. Also, the potential of the battery 9 has an optimum value, dependent on the types of lubricant tested, and readily discovered by experiment. Too low a value gives irregular meter readings, while too high a value gives steady readings, but fails to respond accurately to the true lubricating value of the test sample. A potential just high enough to give steady readings is desirable.

The device shown in Figs. 3 and 4 is intended for cyclically varying the relative velocity of the test surfaces, while maintaining a constant pressure. In Fig. 3, a ball 31 is mounted on a rod 32, and adapted to slide along a pair of surfaces 33, 33, one of which only is shown in the section in Fig. 3. A ball and socket joint 34 connects the rod 32 with reciprocating rod 35, driven by a connecting rod 36 from a crank 37 and a pulley 38, operated by a motor 39.

The surfaces 33, 33, are insulated from the frame by insulating plates, shown elsewhere, and terminals 41, 42, connecting to these surfaces 33, 33, are connected by an electric circuit containing a resistor 43, a battery 44, and a meter 45. A heater 46 automatically maintains the frame 47 at the predetermined and set temperature desired for the test. The oil sample under test is shown at 40, Fig. 4, which is a partial transverse section of Fig. 3 and shows the ball 31, and the test surfaces 33, 33, separated by insulating plates 35' from the frame 47.

In operation, new oil, of a grade suitable for use in some certain car, is placed in the device, so as to lubricate the ball 31 and the surfaces 33, 33. With the heater at the desired temperature, the motor 39 is started, imparting reciprocating motion to the ball 31. This ball presses on the plates 33, 33, with a constant gravitational component, but due to the variable velocity of the reciprocating motion, the oil film between the plates and the ball will not remain intact for all portions of the cycle. When the velocity falls to too low a value, the ball will force itself through this film and establish contact between the plates. The film will again separate the ball from the plates as soon as the velocity has risen to a sufficient value.

By suitably constructing the angle between the plates, the device may be made to open and close the electric circuit twice each cycle, the proportionate times during which the circuit is open and closed determining the meter readings.

With a given scale reading for new oil, used oil from the crank case of a car is substituted, and, if it is inferior as a lubricant, a higher meter reading will result.

Thus, in either of the devices shown in Figs. 1 and 2, or 3 and 4, the essence of the operation lies in periodically and cyclically varying the dynamic conditions of test, by which term I mean the pressure between, and the velocity of, the test surfaces, and indicating that portion of the cycle during which contact occurs. By repeating the cycles rapidly and successively, the meter reading may be made to represent the average or effective value of the contact portions of a number of successive cycles, thus furnishing a truer indicated value for the oil under test than could be obtained from any single measurement.

Although Fig. 1 shows a device operated at substantially constant velocity but variable pressure, and Fig. 3 shows a device operated at constant pressure, but variable velocity, it is not essential, in my invention, to maintain either of these values constant while the other is varied. Fig. 5 shows a detail of an arrangement whereby both pressure and velocity are cyclically varied.

Referring to Fig. 5, a ball 51 is driven with a reciprocating motion by a rod 52, and a ball and socket joint 54, from a reciprocating rod 55, similar to the arrangement in Fig. 3, except that a spring 56 is attached to the rod 52 in such fashion as to add to the pressure component with which the ball 51 bears against the plate 53. This additional pressure varies cyclically, being greatest when the reciprocating motion is at its extreme values, and least when at the reciprocating mean. Thus velocity is at a minimum when pressure is at a maximum, and a test cycle is obtained where both of these dynamic conditions function to establish cyclic intervals of contact.

While I have shown, as a means for indicating contact, the establishment of an electric circuit between the test surfaces, I am also able to indicate such contact in other ways. For example, the vibrations produced by scraping resulting from contact may be amplified and used to indicate such contact.

Fig. 6 shows a detail of such an indicating means. An eccentrically rotating ball 61 is driven by a shaft 62, and bearing against a spring 63, whose pressure against the ball is adjustable by the screw 67, acting through the flexible strut 65.

The spring 63 is mounted on a ring 64 of resilient metal, within which a piezo-electric crystal 68 is mounted, preferably by some such medium as dental amalgam applied at 69. A coating 70, attached to the crystal, is grounded to the ring 64, while the other coating 71 is attached by the conductor 72 to the input circuit of the amplifier 75, the other input terminal being connected to the ground terminal 73.

The amplifier 75 is preferably so adjusted that its output reaches a maximum, or ceiling value, for very small input energies.

In operation, whenever the ball 61 and the spring 63 make contact, either directly, or through the medium of intervening gritty particles, the vibrations due to such contact are transmitted to the crystal 68, which acts in the well known manner to convert these mechanical vibrations into electrical variations. These variations are amplified and affect the meter 76. Since the amplifier has been adjusted to reach saturation or ceiling output for small input, the meter reading may be made to correspond to the duration, but not to the intensity, of the scraping vibrations.

Another method of indicating contact is shown in Fig. 7, in which a ball 81 is eccentrically rotated by a shaft 82, and in contact with a spring 83, whose pressure against the ball may be varied by the screw 87, acting through the flexible strut 85, and the secondary leaf spring 84. A spring 95 is attached to the end of the spring 83, and to an intermediate point on the spring 84, in such manner that friction between the ball and the spring 83 will cause flexure of the spring 95. Insulating material 86 separates these springs from the frame of the apparatus, on which a contact screw 97 is mounted. An electric circuit, containing a resistor 98, a battery 99, and a meter 100 joins the spring 95 and the contact screw 97, which latter is set to maintain contact during that portion of the cycle when the ball and spring are separated by a film of oil.

Whenever the ball and spring come into contact, the frictional force is sufficient to separate the contact between 95 and 97. Thus the meter reading will indicate the fraction for each cycle during which the lubricant is effective.

The arrangement shown in Fig. 7 differs from those preceding it, in that poorer lubricants will give lower scale readings. Psychologically, this has an advantage, in that the mind usually associates higher readings with higher quality.

Fig. 8 shows a circuit by which such arrangements as shown in Fig. 1 and Fig. 3 may be made to give higher meter readings for higher lubricating powers, and vice versa. An eccentrically rotating ball 1, mounted on a shaft 2, presses against a spring 3, thereby periodically closing a circuit containing a resistor 104 and a battery 105. The same circuit is adapted, in the usual fashion, to apply bias potential to the grid 108 of the triode 107, at such times as the circuit between ball 1 and spring 3 is interrupted by a film of oil. This bias is sufficiently positive to cause a limiting value of current to flow from the battery 110 through the meter 111 and the plate circuit of the tube 107. When the circuit between ball 1 and spring 3 is closed by contact between the ball and spring, a battery 106 operates to provide cut-off bias, and interrupt the flow of current through the meter 111.

Thus the device shown in Fig. 8 will operate to give higher meter readings when the intervals of open circuit from 1 to 3 are longer, these higher readings thus corresponding to higher lubricating quality of oil.

By actual test on an oscilloscope, I have determined that the successive cycles of contact between the test surfaces in the various forms of my invention do not repeat consistently at identical values.

Fig. 9 illustrates this point in a graph, in which the abscissae represent elapsed time, in cycles, while the ordinates represent current. Assuming that contact of the test surfaces will cause the flow of a fixed maximum current, indicated at 121, successive cycles may then cause current pulses such as those shown at 122 and 123. A succession of such pulses, following each other with sufficient rapidity, will produce, on the usual type of slowly acting meter, a reading corresponding to the integrated value of the succession of individual pulses. Appropriate electrical or mechanical means for slowing down the meter response will extend this averaging action over a larger succession of pulses, if desired. Where operating conditions render the individual readings on each cycle somewhat variable from the average, this integrating action will produce much more uniform and readable results.

Since battery operation is not always satisfactory, I have devised a circuit by which my invention may be operated from alternating current supply lines. Fig. 10 shows this circuit, in which 200 and 201 are terminals leading to the ball and spring, between which contact is periodically made. Reference characters 219, 202, 203, 204, 205 and 206 represent resistances of appropriate values. Terminals 207 and 208 are connected to the supply line alternating potential. Sliding contacts 209 and 210 are adjustable to divide the resistors 204 and 205 at desired points, as will be described hereafter. 211 is a meter, 212 is a condenser, while 213 is a pentode whose plate is 214, and whose shields and grid are 215, 217 and 216, while 218 represents the cathode. With the circuit 200, 201 open, contact 210 may be adjusted to produce a maximum, or full scale reading on the meter 211. Thereafter, with the contacts 200, 201 closed, the contact 209 may be adjusted to bias the tube 213 to cut-off. This circuit will then operate, in a manner obvious to those skilled in the art, to pass a predetermined maximum value of current through the meter 211 at all times when the circuit 200, 201 is open, and to pass no current through the meter when 200, 201 are in contact. When applied to devices such as those shown in Fig. 1 and Fig. 3, I find that such a circuit gives exceptionally stable performance. I have used successfully elements having the following values:

219=250,000 ohms.
   202=100,000 ohms.
   203=150,000 ohms.
   204=3,000 ohms.
   205=500 ohms.
   206=7,500 ohms.
   212=4 mf.
   213=pentode, type 6-c-6.
   211=milammeter, 0-1 m. a.
   Potential, 207-208=110 volts.

What is claimed is:

1. The process of testing lubricant which comprises introducing a film of lubricant between a pair of opposed surfaces, continuously pressing the surfaces toward each other, moving one surface relative to the other through a number of repeated uniform cycles, and in a direction transverse to the direction of pressure and measuring the durations in the cycles in relation to the total cycle periods, during which the surfaces are entirely separated by lubricant.

2. A process of testing lubricant which comprises introducing a film of lubricant between a pair of opposed surfaces, continuously pressing the surfaces toward each other, moving one surface relative to the other in such manner that the pressure between the surfaces is cyclically varied through repeated cycles, and in a direction transverse to the direction of pressure and measuring the durations in the cycles in relation to the total cycle periods, during which the surfaces are entirely separated by lubricant.

3. The process of testing lubricant which comprises introducing a film of lubricant between a pair of opposed surfaces, continuously pressing the surfaces toward each other, moving one surface relative to the other in such manner that the velocity between the surfaces in a direction transverse to the direction of pressure, is cyclically varied through repeated cycles, and measuring the durations in the cycles in relation to the total cycle periods, during which the surfaces are entirely separated by lubricant.

4. The process of testing lubricant which comprises introducing a film of lubricant between a pair of opposed surfaces, continuously pressing the surfaces toward each other, moving one surface relative to the other in such manner that the pressure and the velocity between the surfaces is cyclically varied through repeated cycles, and measuring the durations in the cycles in relation to the total cycle periods, during which the surfaces are entirely separated by lubricant.

5. In a system for testing lubricant, a pair of members having opposed surfaces, means for supplying lubricant to be tested between the surfaces, means for causing relative movement between the surfaces, through repeated uniform cycles, one of said members being provided with means for varying the pressure during the cycles, and in a direction transverse to the movement, and electrical means indicating the durations in the cycles in relation to the total cycle periods, during which the surfaces are entirely separated by the lubricant.

6. In a system for testing lubricant, an eccentrically mounted member having an exterior circular surface, a spring member opposed to said surface, means for supplying lubricant to said surface, means for cyclically moving the mounted member angularly about its eccentric mounting, and means indicating the durations in the complete cycles of rotation of the member in relation to the durations of the cycles, during which the mounted member and the spring member are entirely separated by the lubricant.

7. In a system for testing lubricant, a pair of members having surfaces in opposition to each other, one of said members having a plane surface and the other a curved surface, means for reciprocating the curved surface member over the plane surface, means for supplying lubricant to said surfaces, and means for indicating the durations in the complete reciprocations of the curved surface member in relation to the durations of the reciprocations, during which the members are entirely separated by the lubricant.

8. In a system for testing lubricant, a pair of members having surfaces in opposition to each other, one of said members having a plane surface and the other a curved surface, means for reciprocating the curved surface member over the plane surface, means for varying the pressure between the surfaces during the reciprocations, means for supplying lubricant to said surfaces, and means for indicating the durations in the complete reciprocations of the curved surface member in relation to the durations of the reciprocations, during which the members are entirely separated by the lubricant.

9. In a system for testing lubricant, a pair of members having opposed surfaces, means for supplying lubricant to said surfaces, means for moving one of said surfaces relatively to the other through repeated uniform cycles, a vibration sensitive structure joined to the member which is not moved, by said moving means, and adapted to be subjected to a longitudinal strain by the frictional force between the members, and a translating device cooperating with the vibration sensitive structure for indicating the frictional forces.

10. In a system for testing lubricant, a pair of members having opposed surfaces, means for supplying lubricant to said surfaces, means for moving one of said surfaces relatively to the other through repeated uniform cycles, means whereby the pressure between the surfaces is varied during a cycle, a vibration sensitive structure joined to the member which is not moved by said moving means, and adapted to be subjected to a longitudinal strain by the frictional force between the members, and a translating device cooperating with the vibration sensitive structure for indicating the frictional forces.

11. In a system for testing lubricant, a pair of members having opposed surfaces, means for supplying lubricant to said surfaces, means for moving one of said surfaces relatively to the other through repeated uniform cycles, a pair of electrical contacts, one of which is movable in accordance with the force exerted by the movable member upon the other member, and an electric circuit including an integrating indicator, controlled by said contacts.

12. In a system for testing lubricant, a pair of members having opposed surfaces, means for supplying lubricant to said surfaces, means for moving one of said surfaces relatively to the other through repeated uniform cycles, means whereby the pressure between the members is varied during a cycle, a pair of electrical contacts, one of which is movable in accordance with the force exerted by the movable member upon the other member, and an electric circuit including an integrating indicator controlled by said contacts.

13. In a system for testing lubricant, a pair of members having opposed surfaces, means for supplying lubricant to said surfaces, means pressing the surfaces toward each other, means for moving one of said surfaces relatively to the other through repeated uniform cycles, and in a direction transverse to the pressure, and an electronic emission device having an input and an output circuit, said input circuit including a resistance, said resistance being also connected across the members, and the output circuit including a current integrating device.

14. In a system for testing lubricant, a pair of members having opposed surfaces, to which surfaces lubricant may be applied, means pressing the surfaces toward each other, means for moving one of said surfaces relatively to the other through repeated uniform cycles of motion, in which the dynamic characteristics of the motion are varied, and in a direction transverse to the pressure, an electrical circuit including an indicator, and means for controlling said circuit to indicate the intervals of the cycles during which the surfaces are entirely separated by the lubricant, the means for moving one of the surfaces relatively to the other being arranged to provide such rapid succession of cycles as to cause the indicator to indicate the integrated said intervals with relation to the total cycle periods.

FRANK RIEBER.